United States Patent
Patel

(10) Patent No.: US 6,686,876 B1
(45) Date of Patent: Feb. 3, 2004

(54) PHOTON PRIMED NON-RADIOACTIVE GAS PLASMA RECEIVER PROTECTOR

(75) Inventor: Sumantrai D. Patel, Silver Spring, MD (US)

(73) Assignee: Northrop Grumman Corporation, Los Angeles, CA (US)

(*) Notice: Subject to any disclaimer, the term of this patent is extended or adjusted under 35 U.S.C. 154(b) by 0 days.

(21) Appl. No.: 10/282,041

(22) Filed: Oct. 29, 2002

(51) Int. Cl.$^7$ ................................................. G01S 7/22
(52) U.S. Cl. ..................... 342/198; 342/175; 333/99 PL
(58) Field of Search ................................. 342/198, 175, 342/52, 54; 333/17.2, 211, 99 PL

(56) References Cited

U.S. PATENT DOCUMENTS

| | | | |
|---|---|---|---|
| 3,644,779 A | 2/1972 | Goldie | 315/39 |
| 3,745,567 A | * 7/1973 | Quinn et al. | 342/198 |
| 4,027,255 A | 5/1977 | Blakeney et al. | 333/13 |
| 4,044,357 A | * 8/1977 | Goldie | 342/200 |
| 4,085,390 A | 4/1978 | Standing | 333/33 |
| 4,176,295 A | 11/1979 | Driver et al. | 315/39 |
| 4,177,437 A | 12/1979 | McLaughlin et al. | 333/313 |
| 4,194,200 A | 3/1980 | Goldie | 342/92 |
| 4,232,278 A | 11/1980 | Gawronski et al. | 333/13 |
| 4,245,197 A | 1/1981 | Goldie | 333/13 |
| 4,266,202 A | 5/1981 | Goldie | 333/13 |
| 4,267,530 A | 5/1981 | Cherry et al. | 333/13 |
| 4,296,385 A | 10/1981 | Esterson et al. | 331/90 |
| 4,395,684 A | 7/1983 | Goldie et al. | 333/13 |
| 4,496,917 A | 1/1985 | Goldie et al. | 333/13 |
| 4,575,692 A | 3/1986 | Goldie | 333/13 |
| 4,673,896 A | 6/1987 | Brady et al. | 333/13 |
| 4,816,785 A | 3/1989 | Carlisle et al. | 333/99 MP |
| 4,963,842 A | 10/1990 | Patel | 333/13 |
| 4,989,006 A | * 1/1991 | Roth | 342/1 |
| 5,097,231 A | 3/1992 | Johnson et al. | 333/13 |
| 5,134,414 A | * 7/1992 | Ditullio et al. | 342/198 |

FOREIGN PATENT DOCUMENTS

SU 1334220 A * 8/1987

OTHER PUBLICATIONS

"Fast–Acting Varactors for Sub–Nanosecond Power Limiting in Receiver Protectors", Nelson, T.M.; Goldie, H.; Microwave Symposium Digest, S–MTT International, Vol: 74 Issue: 1, Jun. 1974 P: 176–178.*
"A 2–Kilowatt Average Power X–Band Receiver Protector for the Lincoln Laboratory SoSi Radar", Goldie, H.; Microwave Symposium Digest, MTT–S International, Vol: 76 Issue: 1, Jun. 1976 P: 148–150.*
"An RF–Primed All–Halogen Gas Plasma Microwave High Power Receiver Protector", Goldie, H.; Patel, S.; Microwave Symposium Digest, MTT–S International, Vol: 82 Issue: 1, Jun. 1982 P: 69–71.*
"An RF–Primed All–Halogen Gas Plasma Microwave High– Power Receiver Protector", Goldie, H.; Patel, S.; Microwave Theory and Techniques, IEEE Transactions on, Vol: 82 Issue: 12, Dec. 1982 P: 2177–2184.*

* cited by examiner

Primary Examiner—John B. Sotomayor
(74) Attorney, Agent, or Firm—Birch, Stewart, Kolasch & Birch, LLP

(57) ABSTRACT

A gas plasma type receiver protector for a radar system includes a priming device in the form of a miniature high intensity blue light emitting diode (LED) ranging in wavelength from 470 nm to 490 nm, an ultra-violet LED, miniature lamp or laser diode ranging in wavelength from 260 nm to 470 nm.

30 Claims, 8 Drawing Sheets

PHOTON PRIMED NON-RADIOACTIVE GAS PLASMA RECEIVER PROTECTOR

BACKGROUND OF THE INVENTION

1. Field of the Invention

The present invention relates to receiver protectors and, more particularly, to receiver protectors for radar systems where high power transmit RF pulses and relatively low power receive RF pulses propagate in a common waveguide type transmission line.

2. Description of Related Art

Receiver protectors for present state of the art high power radar systems are generally known and in some systems utilize radioactive tritium or promethium-147 materials to generate seed electrons to initiate gas breakdown. A continuous supply of β emission, i.e. electrons, is provided by such sources and normally have a useful life of more than 30 years, particularly in tritium primed devices. Radioactive sources do not require any external power to generate seeding electrons and, therefore, are useful in passive receiver protectors. However, radioactive sources provide safety hazards and are expensive to store, dispose of, and repair.

Solid state receiver protectors using high power silicon PIN diodes have also been designed as an alternative to radioactive primed gas plasma stages. However, the peak and average power handling capabilities of these devices are generally limited to 3–5 kilowatts peak and 100–200 watts average, at X-band, due to the need for fast recovery time and low insertion loss. High power handling capability, up to megawatt levels, passive operation, fast recovery times, low insertion loss, and low spike/flat leakages are thus advantages of gas plasma receiver protectors.

In addition, use of quartz gas envelopes in receiver protectors have extended the lifetime of these devices beyond 30 years for many applications. In some designs, a solid state receiver protector is also used for continuous operation which is preceded by a glass plasma stage as an overload protector in order to achieve long lifetimes.

With respect to non-radioactive gas plasma stages, prior designs of receiver protectors have included a DC keep-alive voltage in the priming source. However, this has the disadvantage of requiring a relatively high voltage power source on the order of 400 $V_{DC}$ while having a lifetime of only a few hundred hours.

RF primed gas stages are also known in the art, but have been relatively expensive to fabricate. Generating priming electrons by field emission using a cathode within an array of fine diamond tips which act as field emitting diodes is also a known concept but has the disadvantage of suffering damage during high power RF transmission through the device, thereby limiting its useful lifetime.

Also, while the concept of generating high energy photons by the use of high energy short duration lasers is generally known, they are generally undesirable for radar receiver protector applications.

SUMMARY

Accordingly, it is an object of the present invention to provide an improvement in receiver protector apparatus for radar systems.

It is a further object of the invention to provide a non-radioactive gas plasma receiver protector for radar systems.

And it is a further object of the invention to provide a photon primed non-radioactive gas plasma receiver protector for radar systems.

These and other objects of the invention are achieved by a receiver protector for a radar system including a photon source as a priming device for a gas plasma type receiver protector, and where the priming device comprises a light source in the form of a miniature high intensity blue light emitting diode (LED) ranging in wavelength from 470 nm to 490 nm or an ultra-violet LED or miniature lamp or laser diode ranging in wavelength from 260 nm to 470 nm.

In the broadest aspect of the invention, it is directed to a photon primed non-radioactive gas plasma receiver protector for radar systems, comprising: a section of microwave transmission line coupled to radar receiver apparatus and including an input port and an output port; a first and a second RF reflection stage located between the input port and the output port of the section of transmission line for reflecting RF energy incident at the input port while propagating an attenuated portion of the RF energy to the output port; said first reflection stage including a discharge gap and at least one container including an ionizable gas located adjacent the discharge gap; said second reflection stage being positioned relative to the first reflection stage so as to reflect maximum RF energy back to the discharge gap to produce ionization of the gas in the container upon incidence of RF energy at the input port; and, at least one photon source in the first reflection stage for emitting photons ranging in wavelength from about 260 nm to about 490 nm and operating as a primer so as to generate seed electrons which initiate ionization of the gas in the container in response to incident RF energy at the input port.

Further scope of applicability of the present invention will become apparent from the detailed description provided hereinafter. It should be understood, however, that the detailed description and specific examples, while disclosing the preferred embodiments of the invention, they are provided by way of illustration only, since various changes and modifications coming within the spirit and scope of the invention will become apparent to those skilled in the art from the detailed description.

BRIEF DESCRIPTION OF THE DRAWINGS

The following detailed description of the invention will be more fully understood when considered in conjunction with the accompanying drawings which are provided for purposes of illustration, and not limitation, and wherein.

DETAILED DESCRIPTION OF THE INVENTION

In the present invention, high frequency photons are used as the primary source of seed electrons for the generation of a gas plasma for reflecting RF energy in a plurality of embodiments of a receiver protector for a radar system. The excitation or ionization of gas molecules by photon quanta depends upon its frequency (or wavelength), photon beam power (intensity), gas type (ionization potential), gas pressure, gas temperature, and the location of photon source with respect to the gas volume to be ionized. The ionization of a given gas by photon radiation occurs at a certain critical photon wavelength called "resonance line" at which the probability of ionization or absorption coefficient is maximum in order to split the outer electron from the atomic shell of the gas.

If one lets hv=photon energy, where h=plank's constant, v=frequency of photon and eVi=the energy required to ionize the gas, then $$eVi = hv = hc/\lambda i \quad (1)$$

where c is the velocity of light, $\lambda i$ is the photon wavelength, and Vi the ionization potential of the gas.

Figure 1:
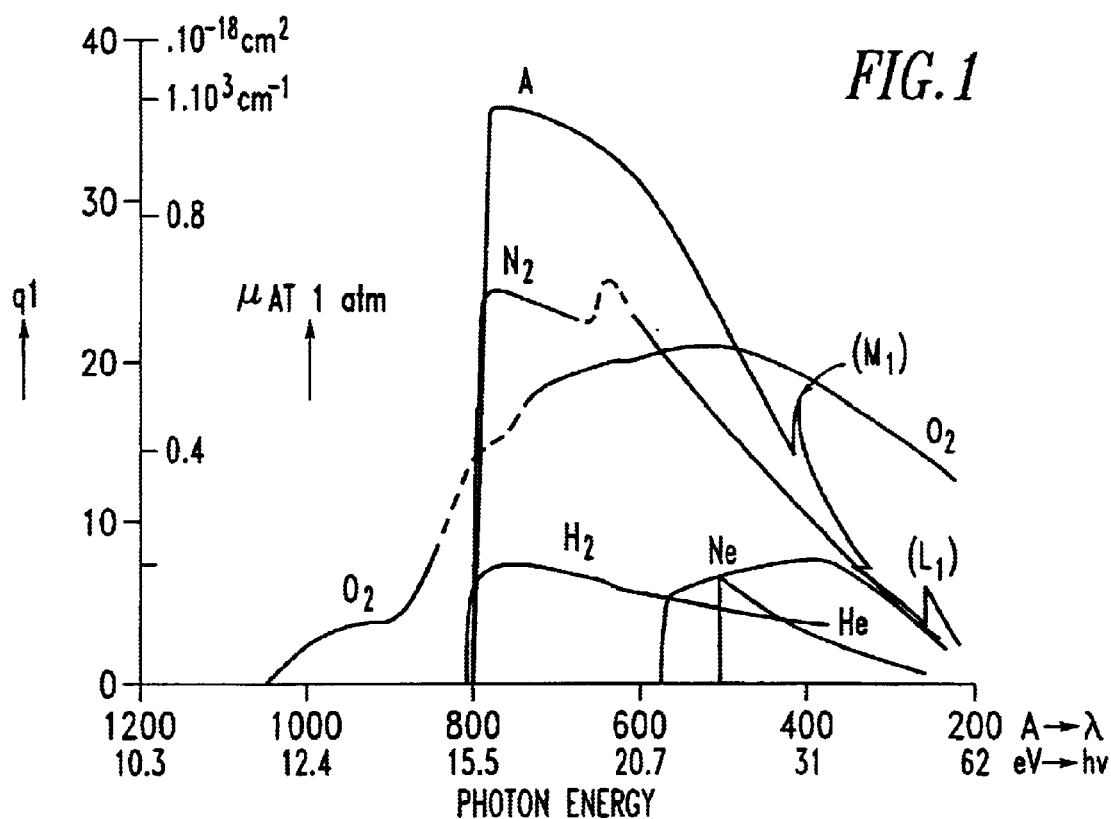
FIG. 1 is a set of characteristic curves illustrative of the relationship of absorption coefficient and absorption cross section as a function of wavelength and quantum energy for various types of gases.

Therefore, there is a critical photon wavelength $\lambda i$ for a given gas type of ionization potential Vi to ionize it, i.e., the energy absorbing coefficient p of a given gas is maximum at the critical $\lambda i$. Characteristics of photoionization absorption coefficients for various gases are shown in FIG. 1.

If a photon quanta of intensity Io travels a distance x through the gas medium, it will produce the electron ion pairs given by the expression:

$$\eta o = (Io/hv)(1-e^{-\mu x}) = 5 \cdot 10^{-7} Io\lambda[1-e^{-\mu x}] \quad (2)$$

where Io is in ergs/sec, $\lambda$ is in A°, $\mu$ is in cm$^{-1}$ and x is in cm.

If, for example, a "blue" light of intensity 2 candela passes through an oxygen gas medium (hv=13.6 Vk), then, for blue light of $\lambda$=4600 A° (460 nm), using the gas pressure of 20 torr and temperature of 25° C., a priming electron density $\eta o \cong 10^{10}$ electrons/cm$^3$ is obtained. In the presence of microwave energy, the $\eta o$ electron pairs will gain energy and create more electrons by inelastic collisions with gas molecules which results in gas breakdown. At X-band it requires about $10^{13}$ electrons/cm$^3$ to create a reflective (plasma reflects incident RF power by virtue of—ve permitivity) gas plasma medium. By using Paschen's curve for oxygen, it is estimated that it will take about 4000 V/ cm of e-field strength to breakdown the gas at pressure of 20 torr for a 0.020" discharge gap. Considering an enhancement of field (13:1) in the iris gap, an estimated ~24 watts of cw RF power is required at x-band to break down the oxygen gas. It is to be noted that the seed electron density $\eta o$ mainly affects the time it takes to create the breakdown and eventually affects the RF breakdown threshold.

The primary advantage of photon radiation in the subject invention is the instantaneous creation of priming electrons at a given discharge gap when illuminated by a photon source. This results in negligible statistical time lag, i.e. the time lag between arrival of RF pulse and the presence of electron in the gap, during the growth of the gas discharge in presence of RF fields. It is to be noted that the photon wavelength longer than critical wavelengths to ionize the gas will be capable of ionizing it but will require higher illumination strength.

While the present invention can utilize LEDs, miniature lamps, or laser diodes ranging from 260 nm to 470 nm (ultra-violet) or 470 nm to 490 nm (blue), in the preferred embodiments of the present invention "ultrabright blue" LEDs operating at about 450 nm with high photon intensity are incorporated into a microwave receiver protector as the priming elements. Present state of the art 450 nm blue LEDs operate at 3.6 V, 20 mA (0.08 watts) DC power. When desirable, however, a UV LED of a shorter wavelength, for example 264 nm, can be utilized as an effective photon source.

Figure 2:
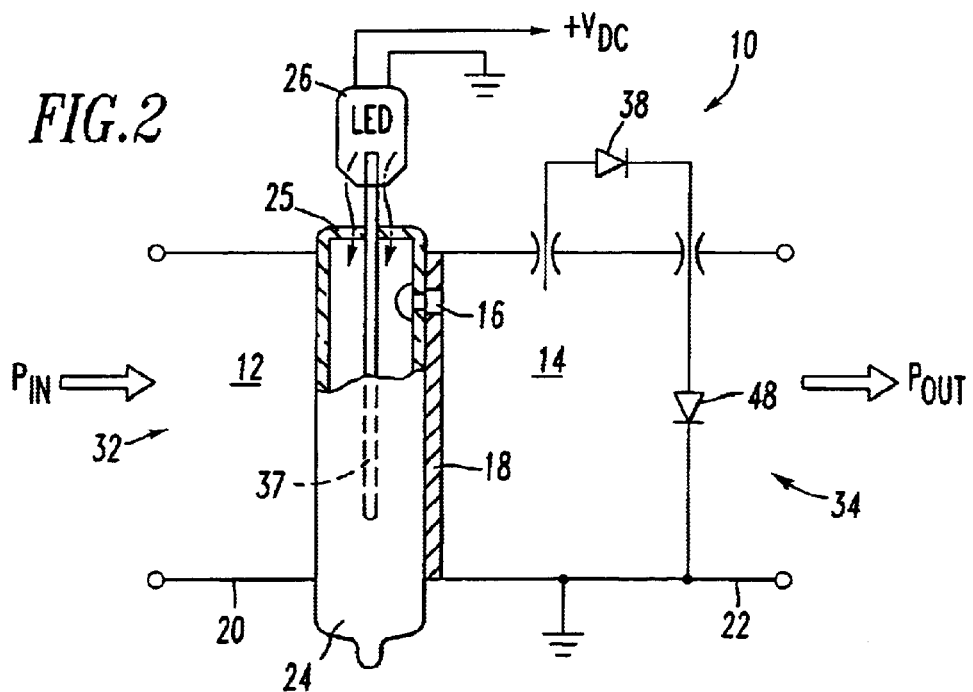
FIG. 2 is an electrical schematic diagram illustrative of a novel photon primed gas plasma stage of a receiver protector in accordance with a first embodiment of the subject invention.
Figure 3A:
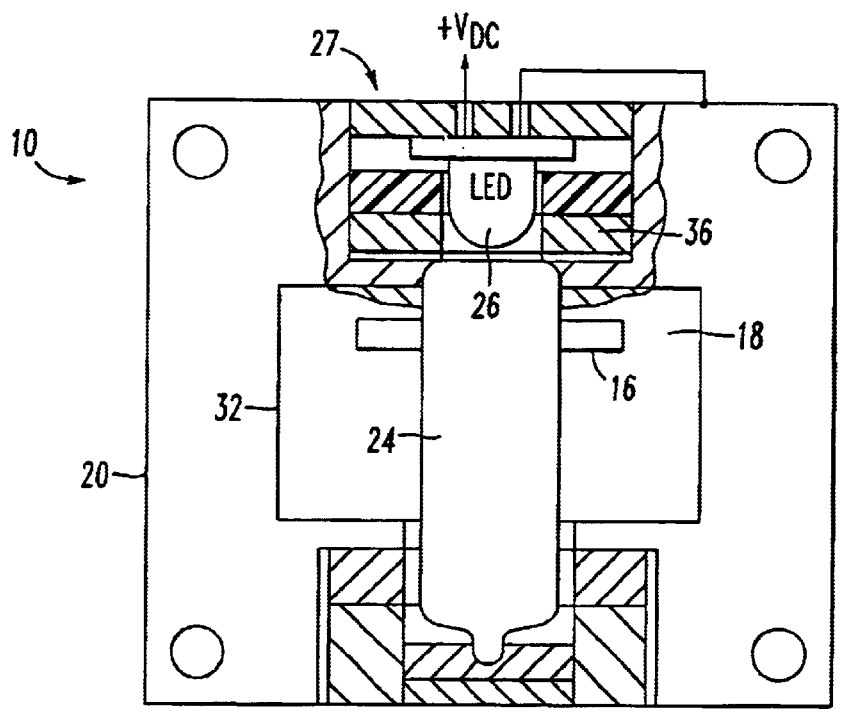
FIGS. 3A and 3B are illustrative of a partial cutaway view and central longitudinal cross sectional view of the first embodiment of the subject invention shown in FIG. 2.
Figure 3B:
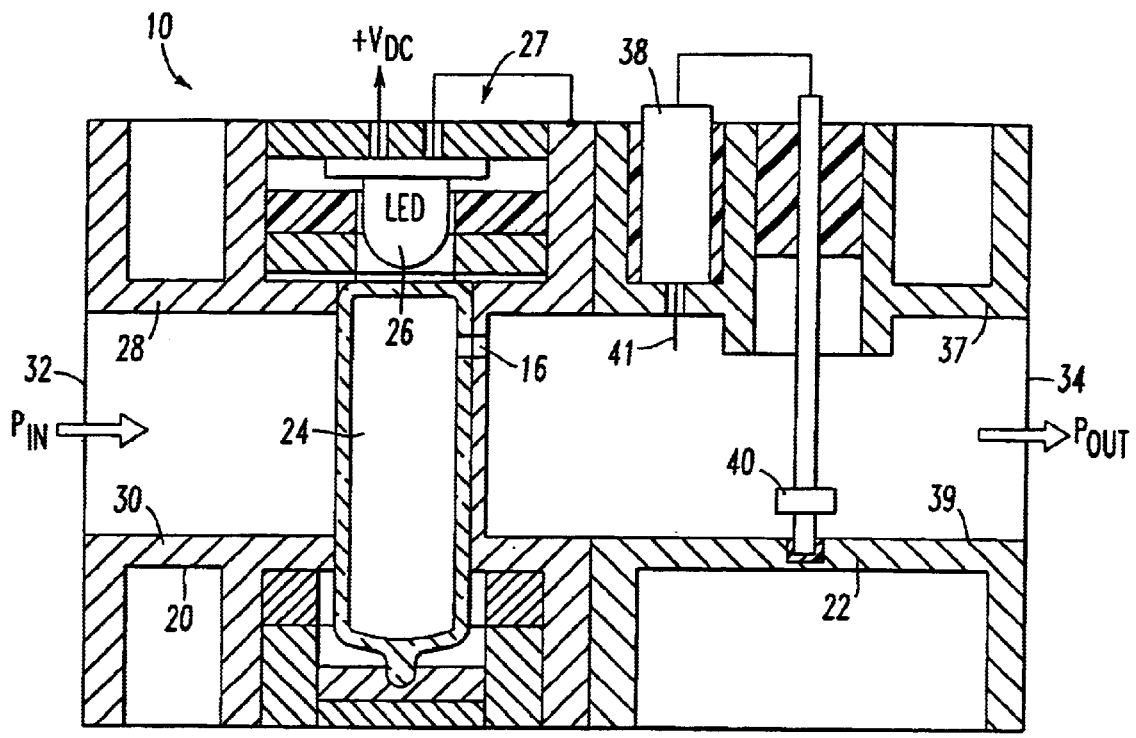

Considering now the details of the subject invention and referring to the drawing figures where like reference numerals refer to like parts, FIGS. 2, 3A and 3B are illustrative of a first embodiment of the invention. There a receiver protector assembly 10 is shown a receiver protector comprised of two main components, namely: a waveguide gas plasma stage 12 followed by a solid state diode stage 14. The solid state diode stage 14 is located at an odd multiple of wavelengths from a resonant iris 16 which consists of an elongated generally rectangular slot located at the top portion of a transverse metal wall 18 located in a first or front section of waveguide 20 of a pair of adjoining waveguide sections including a second or rear section of waveguide 22 as shown in FIG. 3B, and which is located in the transmission line to and from a transmit and receive antenna assembly, not shown, of a radar system.

The gas plasma stage 12 includes a sealed quartz tube 24 which is filled with gas or a gas mixture of noble gases (He,Ar,Ne,A,Xe), halogen gases ($H_2,O_2,Cl_2,CH_4,Co_2$) or gas vapors such as $H_2O$ at pressures ranging from 0.1 torr to several hundred torrs as required.

Further as shown is a photon source 26 consisting of a miniature high intensity light emitting diode (LED) which is mounted adjacent a transparent upper end face 25 of the quartz tube 24. As noted above, an ultraviolet emitting LED is preferred but a blue LED source with a high intensity can be used depending on the particular application.

FIGS. 3A and 3B disclose means for mounting the gas filled quartz tube 24 and the LED 26 in opposing walls 28 and 30 of the front section 20 of waveguide. An input port 32 is connected to the antenna side of a radar system, not shown, while an output port 34 at the rear section 22 of waveguide is adapted to be connected to the receiver side of the radar system. Also located in the top wall 28 of the waveguide section 20 is an annular permanent magnet member 36 which generates an axial magnetic field 37 down through the length of the quartz tube 24 as shown in FIG. 2. This element is an optional component and acts as a focusing element for electrons created by photon energy. The upper face 25 of the quartz tube 24 can also be made to include a convex lens, not shown, to focus the light beam from the LED 26 into the gas region of the quartz tube 24 adjacent the resonant iris 16.

The resonant iris 16 acts to enhance the waveguide electric fields to achieve breakdown of the gas mixture in the quartz tube 24 at low RF energy, typically less than 30 watts peak. An LED having an illumination strength of a few candelas when focused in a narrow beam having a half-angle ≦15° through the end portion 25 of the quartz tube 24 will produce ionization of the gas molecules and will generate many orders of magnitude of electron/ion pairs instantly to provide seeding electrons which gain energy from an incident RF pulse when present at the input port 32 of the front waveguide section 20.

The solid state diode stage 14 of the first embodiment shown in FIGS. 2, 3A and 3B, includes a Schottky barrier (SB) diode detector 38 mounted in the top wall 37 of the rear waveguide section 22 adjacent the LED sub-assembly 27. A PIN diode 40 is mounted between the top and bottom walls 26 and 28 of the rear waveguide section 22 while being connected in series to the Schottky barrier diode detector 38.

The PIN diode stage 14 generates twice the instant voltage at the iris 16, thereby enhancing the field intensity in the gas filled region of the quartz tube 24 at the iris 16. The priming electrons in the quartz tube 24 generate secondary electrons and eventually cause a total breakdown of the gas at certain RF power levels, creating the gaseous plasma which reflects the instant RF energy present at the input port 32. The number density of priming electrons generated by photon energy depends upon the illumination power $I_o$, the photon wavelength, the depth of optical path from the source to the discharge area, the absorption coefficient of the photon of a given wavelength and the type of gas used in the quartz tube 24. Reflection of incident RF energy by the gaseous plasma back towards the input port 32 results in the attenuation of incident RF energy which then appears as leakage energy, such as a spike and flat leakage at the output port 34 of the waveguide section 22. The output RF levels are typically 30–40 db below the incident RF appearing at the input port 32 when using a single gas plasma stage 12 as shown in the first embodiment.

The gas plasma stage 12 and the solid state diode stage 14 are designed so that maximum RF voltage will be reflected into the gap of the iris 16 to achieve gas breakdown in the quartz tube 24 at low incident RF levels. The SB diode detector 36 includes a wire lead 41 extending into the waveguide section 22 from the upper wall 37 so as to provide a DC bias to the PIN diode 40 by using a very small energy from the incident RF pulse and rectifying it, thereby eliminating the need for external power. For a photon source consisting of a blue LED 26, it would require about 0.1 watt DC power to provide the needed photon energy to produce seeding electrons for creating a highly reflecting gas plasma in presence of the high power microwave pulse.

The electrical schematic shown in FIG. 2 indicates that the LED 26 is connected to a +$V_{dc}$ voltage. This comprises a "photonic keep alive" voltage so that the LED is turned on during system warm up and stays on until the system is shut off. It thereby provides a priming electron at any time a high power RF pulse is incident on the gas plasma stage 12 to create gas breakdown instantly by using the energy of the incident microwave pulse present on the input port 32. The high illumination strength, the narrow beam angle focusing the photon energy at the iris 16, the shaping of the quartz end face 25, the gas type, the short optical wavelength of the photon source, the optimum gas pressure, and the quarter wavelength distance between the gas stage 12 and the solid state diode stage 14 are essential to achieve low breakdown threshold.

As noted, the permanent magnet 36 is optional and is not required to create the priming electrons; however, its DC axial magnetic field, when present, enhances the focus of the seeding electrons created by light beam and reduces the diffusion loss during the microwave discharge process which results in a lower firing threshold compared to a non-magnetic implementation.

Figure 4A:
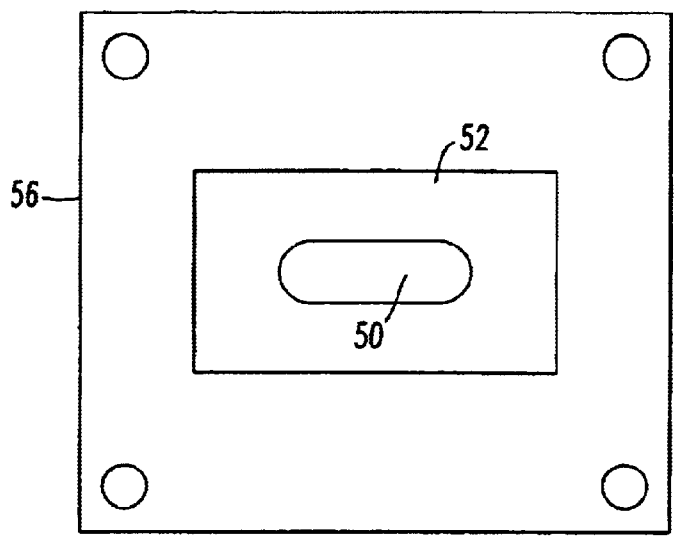
FIGS. 4A and 4B are illustrative of side elevational and central longitudinal cross sectional views of a second embodiment of the subject invention.
Figure 4B:
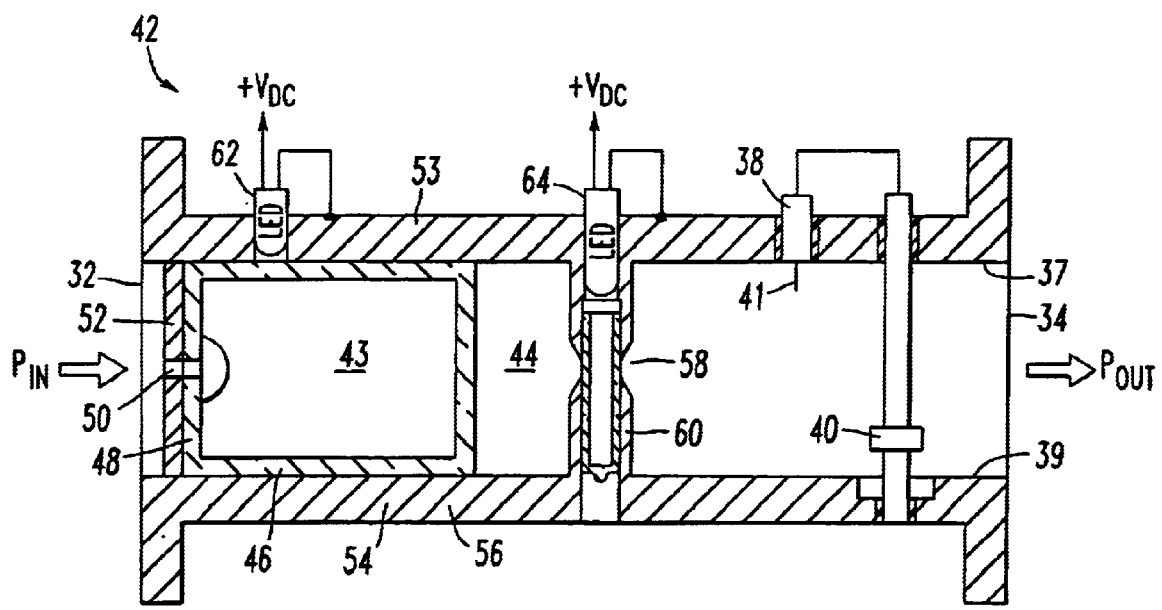

Considering now a second embodiment of the subject invention, it is shown in FIGS. 4A and 4B and discloses a receiver protector 42 including at least two gas plasma stages 43 and 44, and a solid state diode stage 14 including the SB detector diode 38 and the PIN diode 40 as shown in the first embodiment described above. The gas plasma stage 43 includes a horizontal rectangular gas discharge tube or vial 46 having one end 48 located adjacent a first iris 50 formed in a flat metal plate 52 formed across the top and bottom walls 53 and 54 of a front waveguide section 56. The waveguide section 56 of the second embodiment includes a second iris structure 58 containing a second but vertically oriented quartz gas vial 60. The horizontal and vertical quartz gas vials 46 and 60 also have respective LEDs 62 and 64 optically coupled thereto while being located in the top wall 53 of the waveguide section 56. The vertical quartz vial 60 implements a medium power stage which fires at equal to or less than 30 watts peak and reflects the maximum RF voltage into the horizontal rectangular stage including the horizontal vial 46. The horizontal stage 43 fires at equal to or greater than 30 watts peak and will stay fired until maximum operational levels are reached. The medium power vertical stage 44 is similar to the single gas plasma stage 12 included in the first embodiment. Each LED 62 and 64 consumes about 0.1 watts DC power. The horizontal stage 43 is capable of producing at least 30 dB protection for RF power levels beyond 10 kilowatts peak up to megawatt power levels.

Figure 5A:
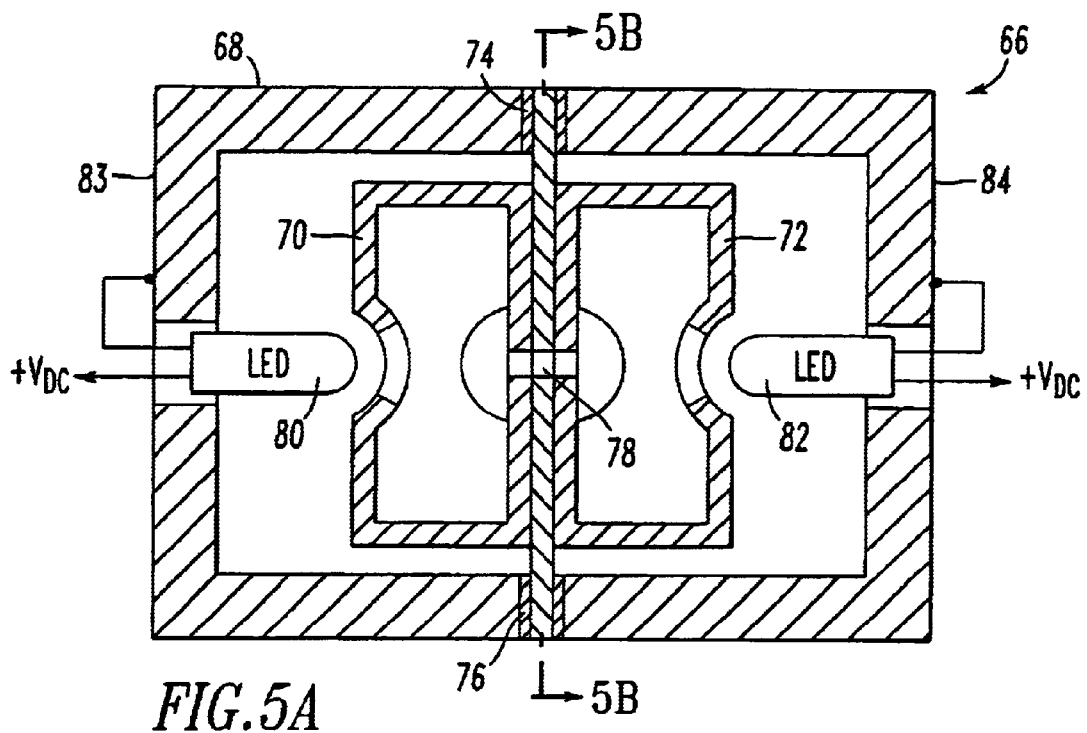
FIGS. 5A and 5B are illustrative of a transverse cross sectional view and a sectional view of a third embodiment of the subject invention taken along the lines 5—5 of FIG. 5A.
Figure 5B:
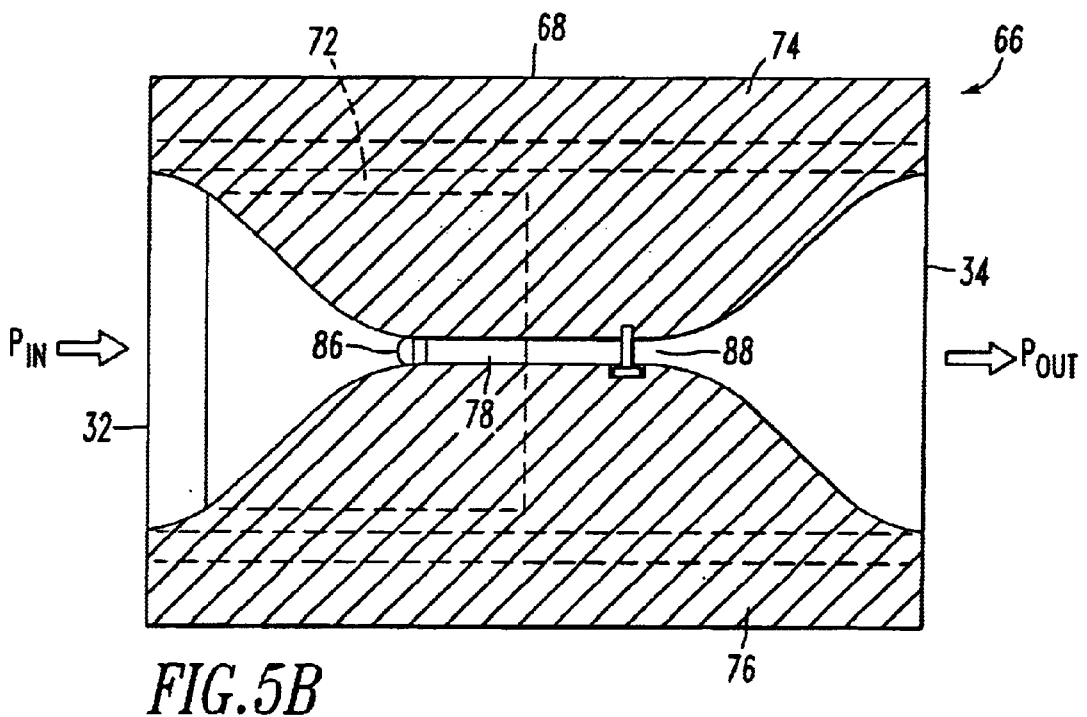

Referring now to FIGS. 5A and 5B, shown thereat is a third embodiment of the invention which discloses a wide-band fin-line gas plasma receiver protector 66 located within a section of waveguide 68. There a pair of longitudinally positioned rectangular quartz envelopes 70 and 72 (FIG. 5A) are secured to each side of a pair of upper and lower metal fins 74 and 76 having tapered or, when desired, stepped forward and rear edges supporting a relatively narrow gap region 78. A pair of photon sources 80 and 82, comprising LEDs, project through opposite side walls 83 and 84 as shown in FIG. 5A so as to apply photons to the gas within the quartz envelopes 70 and 72 at the forward end 86 of the gap region 78. A PIN diode stage 88 is placed at an odd numbered of wavelengths from the forward end 86 of gap region 78 to reflect maximum voltage for achieving a low firing threshold.

Since the RF fields are concentrated only in the narrow region 78 between the fins 74 and 76, the tips of the photon sources, i.e., the LEDs 76 and 78 will not be affected by any RF fields during the incidence of the high power input pulse appearing at the input port 32 of the waveguide section 68. Instantaneous priming electrons provided by the LEDs 76 and 78 initiate the gas breakdown process and create a gaseous plasma at 86 of the narrow gap region 78. The presence of gas plasma will reflect RF power towards the input port 32. The gas plasma will expand along the length of the fins 74 and 76 to provide high power attenuation levels as RF power level is increased to several kilowatts peak. The advantage of a fin-line gas stage is low insertion loss and wide band protection provided, e.g. 8.2 to 12.4 GHz.

Figure 6A:
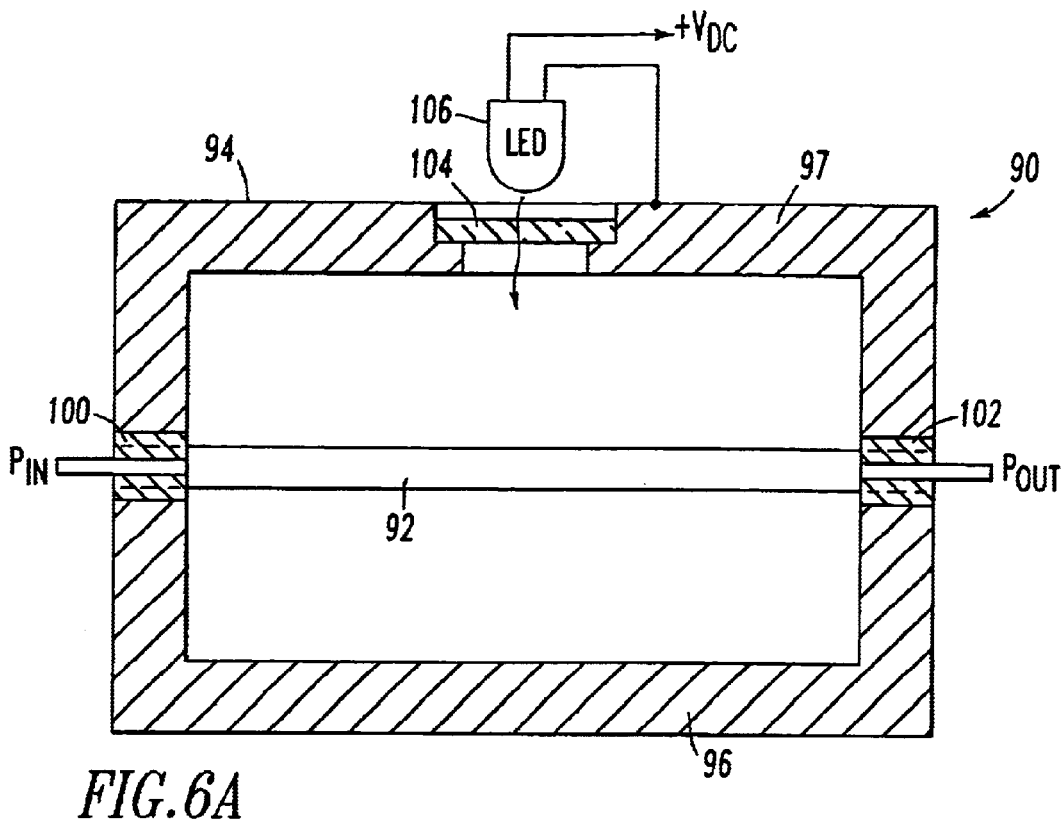
FIGS. 6A and 6B are illustrative of top cross sectional and longitudinal cross sectional view of a fourth embodiment of the subject invention.
Figure 6B:
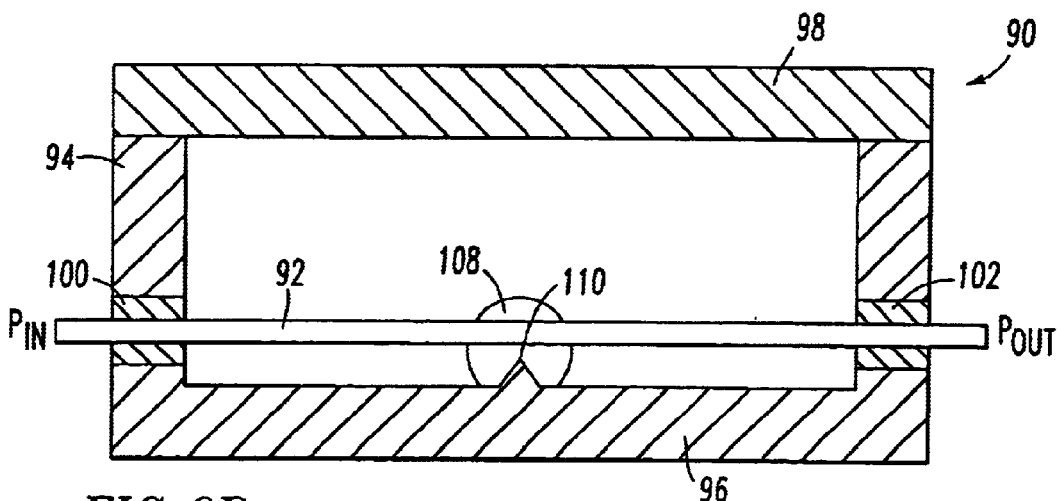

Referring now to FIGS. 6A (top view), and 6B (front view), shown thereat is a fourth embodiment of the subject invention which comprises a microstrip gas plasma receiver protector assembly 90. As shown in FIG. 6B, a length of microstrip transmission line 92 is fed through a sealed low pressure gas filled enclosure 94 including a microstrip ground plate member 96 and a top cover plate 98. A pair of hermetically sealed coaxial feedthrough members 100 and 102 permit the passage of the RF energy into the free space microstrip 92 to pass into and out of the sealed housing 94. The sealed housing 94 also includes a quartz window 104 located next to a photon LED source 106 which is placed adjacent the side wall 97. The microstrip line 92 includes a substrateless (gas-filled) discharge region 108 (FIG. 6B) with a narrow gap and cone tip 110 to enhance the RF field for achieving a low firing threshold for a gas included in the sealed housing 94.

Figure 7:
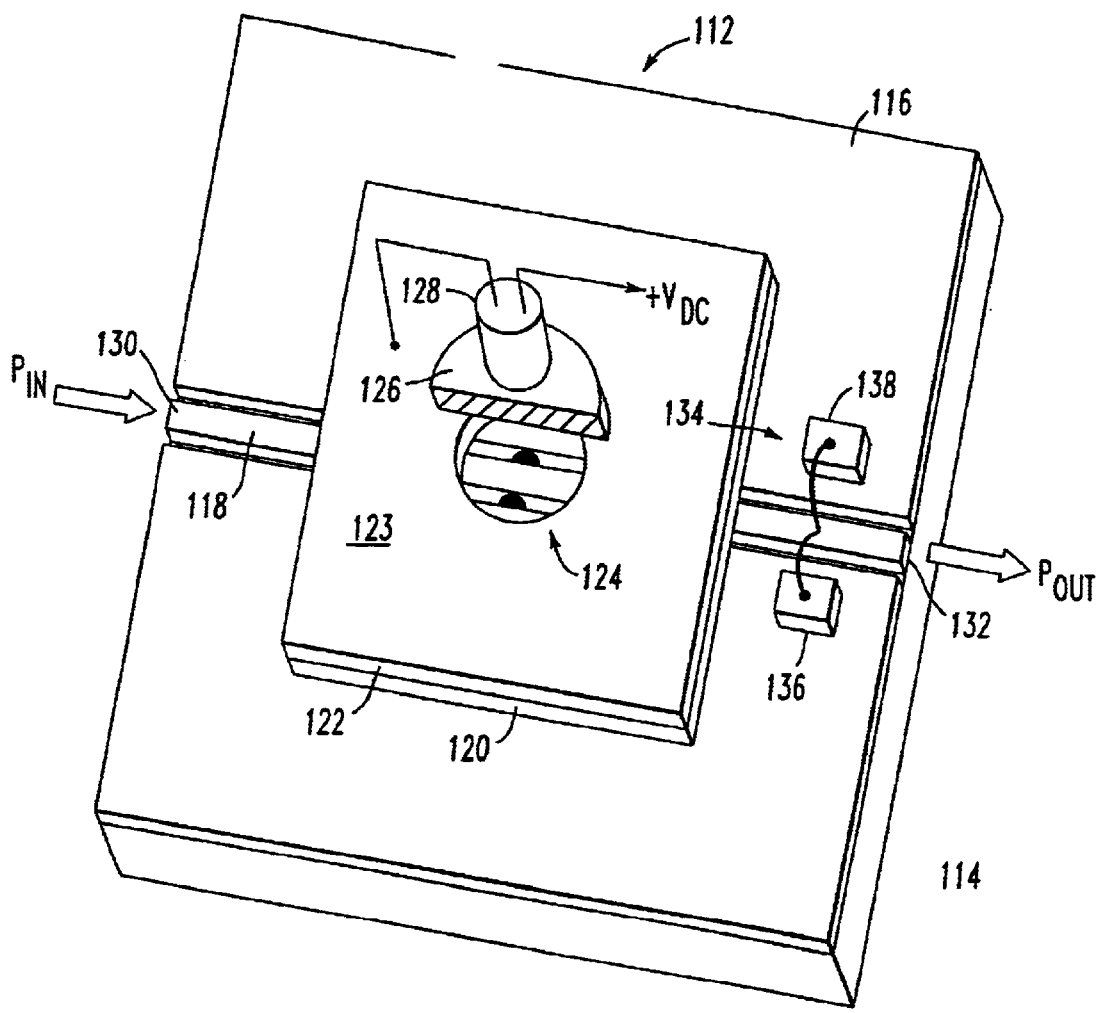
FIG. 7 is a perspective view of a fifth embodiment of the subject invention.

A variation of the concept shown in FIGS. 6A and 6B is illustrated in FIG. 7 which comprises a coplanar transmission line embodiment of a gas plasma receiver protector 112 and is comprised of an assembly including a dielectric substrate 114 on which is formed a metallic ground plane 116 and a coplanar center conductor line 118. A dielectric rectangular housing member 120 and a top metal lid 122 form a sealed gas stage housing 123 over a gap section 124 of the center conductor 118 where the substrate 114 is removed and over which a quartz window 126 is provided in the top metal lid 122 and in which an LED photon source 128 is located. The gas discharge at the narrow gap 124 reflects the incident RF energy towards the input port 130 of the coplanar conductor line 118, resulting in low leakages at the output port 132. Further as shown in FIG. 7, a PIN diode stage 134 including a pair of PIN diodes 136 and 138 are located outside of the gas stage housing 123 and being connected from the ground plane 116 to the coplanar line member 118 inwardly of the output port 132.

Figure 8A:
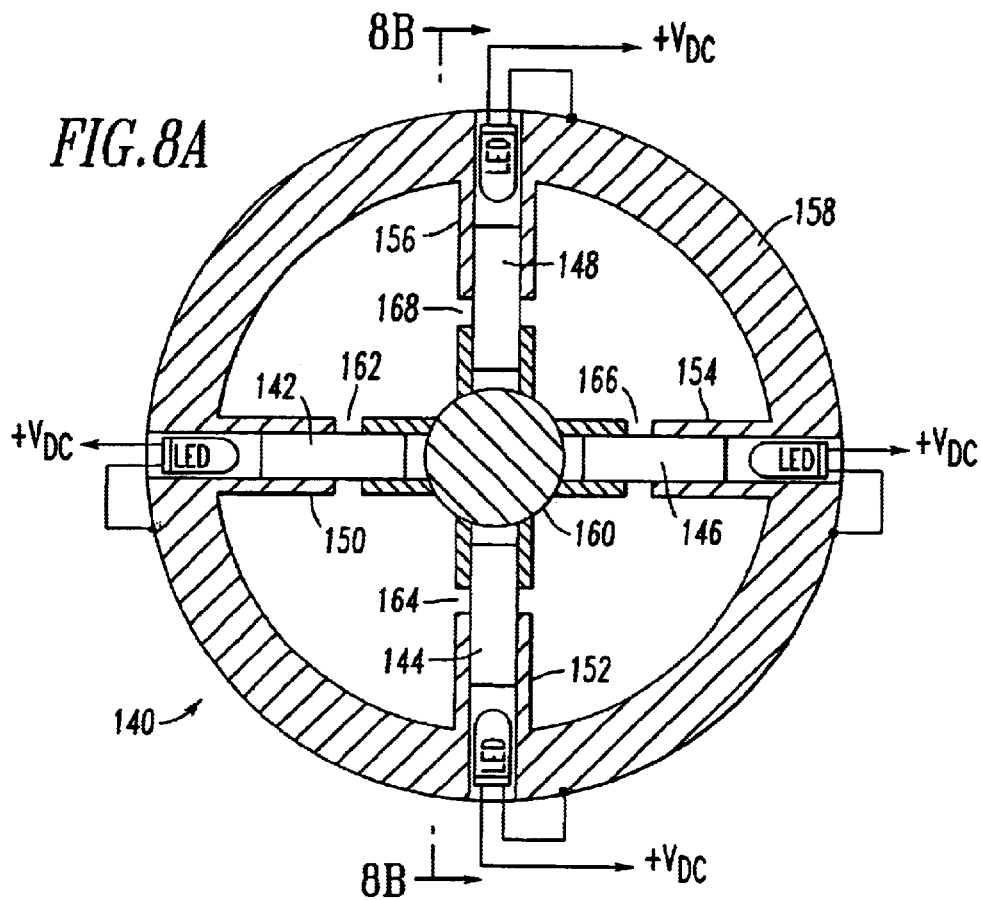
FIGS. 8A and 8B are illustrative of a transverse cross sectional view and a sectional view thereof taken along the lines 8—8 of FIG. 8A of a sixth embodiment of the invention.
Figure 8B:
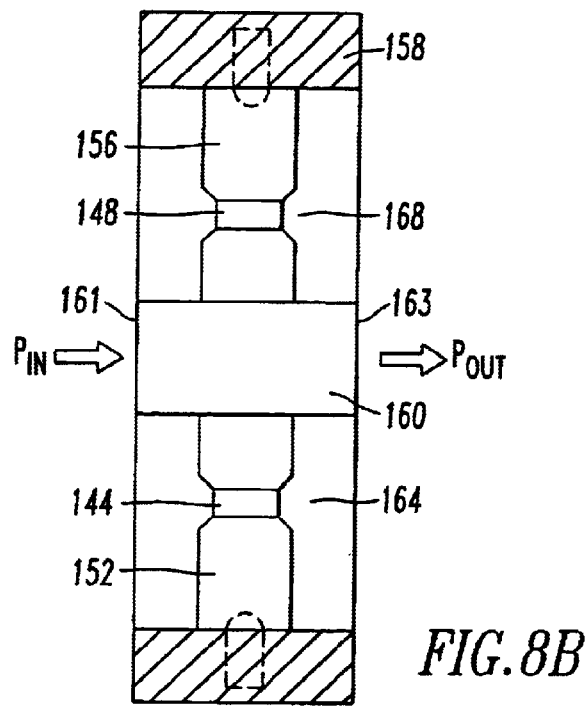

A sixth embodiment of the invention is shown in FIGS. 8A and 8B and comprises a coaxial gas plasma receiver protector 140 where four sealed quartz tubes or vials 142, 144, 146 and 148 are located in quadrature relationship in four hollow spokes 150, 152, 154 and 156 of a coaxial transmission line structure including an outer conductor 158 and an inner conductor 160. Narrow gaps 162, 164, 166 and 168 are formed by splitting the hollow spokes 150, 152, 154 and 156 so as to expose the quartz vials 142 . . . 148 for intercepting high power RF energy transmitted in the inner conductor 160 of the device, and generating a gas plasma in the gaps 162 . . . 168 to reflect the RF energy back to an input port 161 and provide the necessary protection for apparatus at the output port 163. Although not shown, one or more solid state diode stages are also included and are located at odd multiple quarter wavelength distances from the gas plasma vials 142 . . . 148 so as to reflect the maximum voltage onto the gas stage gaps 162 . . . 168. Although four gas stages are shown in the embodiments of FIGS. 8A and 8B, a single quartz envelope and a single photon source can be employed, when desired, as an alternative to the assembly shown.

Figure 9A:
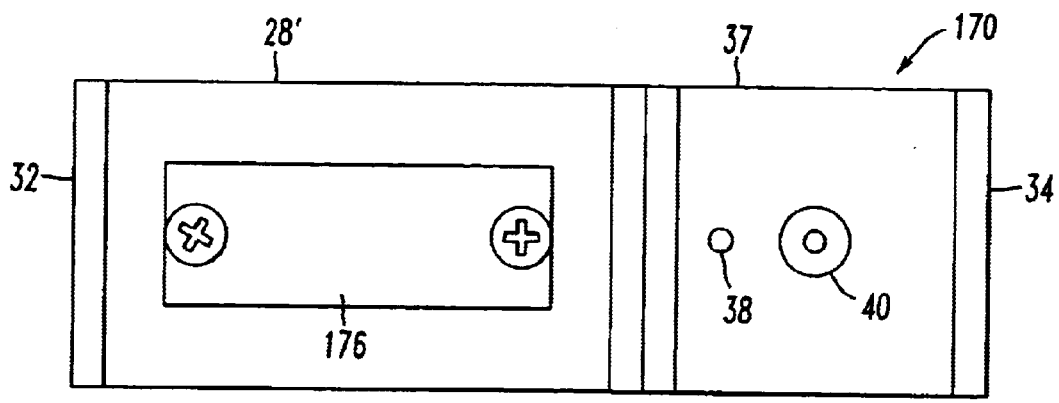
FIGS. 9A and 9B are illustrative of a top plan view, a longitudinal cross sectional view of a seventh embodiment of the subject invention.
Figure 9B:
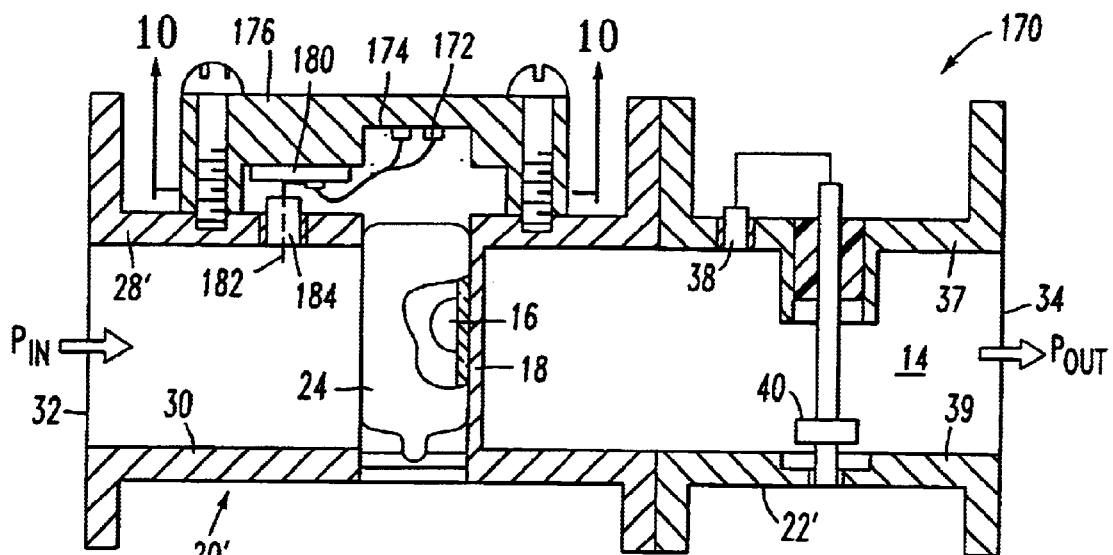
Figure 10:
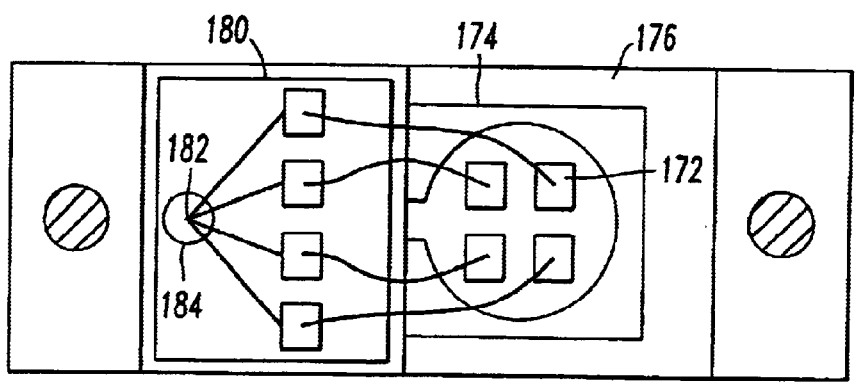
FIG. 10 is a sectional view taken along the lines 10—10 of FIG. 9B.

Referring now to FIGS. 9A, 9B and 10, shown thereat is a seventh embodiment of the present invention and which comprises a passive photon primed gas plasma receiver protector 170. It is similar to the structure shown in FIG. 3B of the first embodiment, with the exception that the LED photon source 26 is now replaced by an LED chip matrix sub-assembly 172 located in a recessed portion 174 of a generally rectangular plate member 176 secured to a top wall 28' of a waveguide section 20'. Situated adjacent the LED matrix 172 is a Schottky barrier detector diode matrix 180 which utilizes a small portion of the incident RF energy sensed by the inner conductor portion 182 of an RF coaxial coupler 184 mounted in the waveguide wall 28'. The diode detector matrix 180 provides DC power to the LED chip matrix 172 during the transmission of each RF pulse appearing at the input port 32. Photon quanta is radiated on the gas discharge tube 24 to create instantaneous gas ionization at the iris 16 in the waveguide wall 18.

The LEDs of the chip matrix 172 are p-n devices fabricated from InGaN or SiC material (for blue light emission). Such devices exhibit fast turn-on time, in the order of 30 nanoseconds or less, to emit the photon spectra capable of providing priming electrons within 30 nanoseconds of the instant RF pulse having a pulse width greater than 30 nanoseconds. Since the DC bias to the LED chip matrix 172 is provided by the incident RF pulse through the RF coupling to the diode detector assembly 184, the intensity of photon emission will increase as the incident RF power level is increased. The amount of priming electrons required is a function of the RF power levels so as to achieve the necessary attenuation.

Thus what has been shown and described is a non-radioactive gas plasma receiver protector which eliminates the safety and health hazards associated with radioactive type receiver protectors. Also, substantial savings in material and fabrication are realized by the use of priming devices disclosed therein as compared with the radioactive priming devices utilized in the prior art. The present invention furthermore permits flexibility in installing the photon sources outside of the sealed quartz envelope compared to the installation inside the end wall. Moreover, power handling capabilities up to megawatt RF overload levels are achievable with the use of a quartz envelope as a sealed container as well as a medium of transmitting photon radiation into the discharge gap. The principles of the present invention are, moreover, adaptable to practically all types of microwave receiver protector structure, and are applicable to receiver protective designs up to millimeter wave frequencies.

The invention being thus described, it will be obvious that the same may be varied and still other ways. Such variations are not to be regarded as a departure from the spirit and scope of the invention, and all such modifications as would be obvious to one skilled in the art are intended to be included within scope of the following claims.

What is claimed:

1. A photon primed non-radioactive gas plasma receiver protector for radar systems, comprising:

a section of microwave transmission line coupled to radar receiver apparatus and including an input port and an output port;

a first and a second RF reflection stage located between the input port and the output port of the section of transmission line for reflecting RF energy incident at the input port while propagating an attenuated portion of the RF energy to the output port;

said first reflection stage including a discharge gap and at least one container including an ionizable gas located adjacent the discharge gap;

said second reflection stage being positioned relative to the first reflection stage so as to reflect maximum RF energy back to the discharge gap to produce ionization of the gas in the container upon incidence of RF energy at the input port; and, at least one photon source in the first reflection stage for emitting photons ranging in wavelength from about 260 nm to about 490 nm and operating as a primer so as to generate seed electrons which initiate ionization of the gas in the container in response to incident RF energy at the input port.

2. A receiver protector according to claim 1 wherein the photon source comprises an ultraviolet or blue light emitting diode (LED), a miniature ultraviolet lamp, or a laser diode.

3. A receiver protector according to claim 2 wherein said blue LED emits light having a wavelength in the range from about 470 nm to about 490 nm.

4. A receiver protector according to claim 2 wherein said ultraviolet LED or miniature lamp emits light having a wavelength of about 260 nm to 470 nm.

5. A receiver protector according to claim 2 wherein said first RF reflecting stage comprises a gas plasma stage and said second RF reflective stage comprises a solid state semiconductor diode stage.

6. A receiver protector according to claim 5 wherein said discharge gap comprises a resonant iris.

7. A receiver protector according to claim 6 wherein the section of microwave transmission line comprises a section of waveguide.

8. A receiver protector according to claim 7 wherein said photon source is mounted in a wall of said waveguide adjacent said container including the ionizable gas.

9. A receiver protector according to claim 8 wherein the container is comprised of quartz.

10. A receiver protector according to claim 9 wherein said solid state diode semiconductor stage includes a semiconductor diode located in the waveguide between the resonant iris and the output port.

11. A receiver protector according to claim 10 wherein said solid state semiconductor diode stage additionally includes an RF detector diode for biasing the semiconductor diode located in the waveguide.

12. A receiver protector according to claim 11 wherein semiconductor diode located in the waveguide comprises a PIN diode and the RF detector diode comprises a Schottky barrier diode.

13. A receiver protector according to claim 11 wherein the RF detector diode is located outside the wall of a waveguide.

14. A photon primed non-radioactive gas plasma receiver protector for radar systems, comprising:

a section of waveguide coupled between a source of RF energy and radar receiver apparatus, said section of waveguide including an input port and an output port;

at least one gas plasma stage located between the input port and a solid state diode stage located behind gas plasma stage and in front of the output port for reflecting RF energy incident at the input port while propagating an attenuated portion of the RF energy to the output port;

said gas plasma stage including a resonant iris and a transparent container including an ionizable gas located adjacent the resonant iris; and, a photon source ranging in wavelength from about 260 nm to about 490 nm and comprised of an ultraviolet or blue light emitting diode or a minature ultraviolet lamp mounted on the section of waveguide for emitting photons into the transparent container, the photon source generating seed electrons for initiating ionization of the gas in the container in response to incident RF energy at the input port, said solid state diode stage being positioned relative to the gas plasma stage and including a semiconductor diode mounted inside the section of wageguide for reflective maximum RF energy back to the resonant iris to produce ionization of the gas in the container upon incidence of RF energy at the input port.

15. The receiver protector according to claim 14 wherein the solid state diode stage additionally includes an RF detector diode for applying a bias voltage to the semiconductor diode in response to RF energy incident at the input port.

16. The receiver protector according to claim 15 wherein the RF detector diode is mounted on the section of waveguide and includes a RF probe extending into the section of waveguide.

17. The receiver protector according to the claim 16 wherein the semiconductor diode comprises a PIN diode and wherein the detector diode comprises a Schottky barrier diode.

18. A receiver protector according to claim 14 and additionally including a second gas plasma stage in front of the solid state diode stage.

19. A receiver protector according to claim 18 wherein said second gas plasma stage also includes a container including an ionizable gas, a resonant iris, and a photon source comprising an ultraviolet blue light emitting diode or a miniature ultraviolet lamp.

20. A receiver protector according to claim 19 wherein the gas container of said second gas plasma stage is aligned with a central longitudinal axis of the waveguide section and the gas container of said at least one gas plasma stage is oriented transverse to the central longitudinal axis.

21. A receiver protector according to claim 2 and additionally including elongated opposing upper and lower metal fins located in a central region of the section of microwave transmission line and extending from the input port to the output port, the fins narrowing to an intermediate gap region between the input and output ports and wherein the first and second RF reflection stages are respectively located at forward and rearward ends of the intermediate gap region.

22. A receiver protector according to claim 21 wherein the section of microwave transmission line compresses a section of waveguide.

23. A receiver protector according to claim 22 and wherein said at least one container comprises a pair of mutually opposing sealed quartz envelopes secured to opposite side surfaces of the upper and lower metal fins.

24. A receiver protector according to claim 23 and wherein said at least one photon source comprises a pair of said photon sources mounted in opposite walls of the section of waveguide.

25. A receiver protector according to claim 24 wherein the metal fins have tapered or stepped forward and rear edges.

26. A receiver protector according to claim 2 wherein the section of microwave transmission line comprises a length of microstrip transmission line and the first RF reflection stage comprises a sealed low pressure gasfill enclosure including a microstrip ground plate member and top cover plate secured thereto and wherein the ground plate includes a quartz window located adjacent the photon source and a projection pointing toward the ionization gas located in the microstrip transmission line.

27. A receiver protector according to claim 2 wherein the section of microwave transmission line comprises a section of coplanar transmission line including a dielectric substrate, a ground plane and a coplanar center conductor having a gap section formed thereon, and wherein the first RF reflection stage includes a sealed low pressure gasfill enclosure including a dielectric housing and a metal lid located over the gap section, and wherein the metal lid includes a quartz window positioned adjacent the photon source.

28. A receiver protector according to claim 2 wherein the section of microwave transmission line comprises a section of coaxial transmission line including an outer conductor and an inner conductor, wherein the first RF reflection stage includes at least one hallow spoke member extending between the outer and inner conductors and including a respective gap section therein, and wherein the first RF reflection stage includes a quartz gas container member located in said at least one spoke member spanning the gap section and wherein the photon source is also located in said at least one spoke member adjacent the gas container member.

29. A receiver protector according to claim 28 wherein the first RF reflection stage includes a plurality of hollow spoke members, respective quartz gas containers and photon sources.

30. A receiver protector according to claim 28 wherein the first RF reflection stage includes a quadrature arrangement of said spoke members, respective quartz gas containers and photon sources.

* * * * *